(12) United States Patent
Tortora

(10) Patent No.: US 10,768,578 B2
(45) Date of Patent: Sep. 8, 2020

(54) SOLAR HAND FOR A PORTABLE OBJECT SUCH AS A WATCH OR A MEASURING INSTRUMENT

(71) Applicant: The Swatch Group Research and Development Ltd, Marin (CH)

(72) Inventor: Pierpasquale Tortora, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 225 days.

(21) Appl. No.: 15/770,340

(22) PCT Filed: Sep. 9, 2016

(86) PCT No.: PCT/EP2016/071365
§ 371 (c)(1),
(2) Date: Apr. 23, 2018

(87) PCT Pub. No.: WO2017/097449
PCT Pub. Date: Jun. 15, 2017

(65) Prior Publication Data
US 2018/0314210 A1 Nov. 1, 2018

(30) Foreign Application Priority Data
Dec. 11, 2015 (EP) .................................... 15199649

(51) Int. Cl.
*G04C 10/02* (2006.01)
*G01D 13/26* (2006.01)
*G04B 19/30* (2006.01)
*G04C 3/00* (2006.01)

(52) U.S. Cl.
CPC ........... *G04C 10/02* (2013.01); *G01D 13/265* (2013.01); *G04B 19/305* (2013.01); *G04C 3/008* (2013.01)

(58) Field of Classification Search
CPC ...... G04C 10/02; G04C 3/008; G01D 13/265; G04B 19/305; G04B 19/04; G04B 19/32; G04B 19/30
USPC .................................................. 368/205, 226
See application file for complete search history.

(56) References Cited

U.S. PATENT DOCUMENTS

| 4,676,662 A | * | 6/1987 | Sekido ................... G04C 10/02 368/205 |
| 5,130,956 A | | 7/1992 | Ueda |
| 5,623,456 A | * | 4/1997 | Miyamoto ........... G04B 19/305 368/226 |
| 6,229,766 B1 | | 5/2001 | Saurer et al. |

(Continued)

FOREIGN PATENT DOCUMENTS

| EP | 0 872 783 A1 | 10/1998 |
| EP | 2 950 168 A1 | 12/2015 |

(Continued)

OTHER PUBLICATIONS

International Search Report dated Dec. 5, 2016 in PCT/EP2016/071365 filed Sep. 9, 2016.

*Primary Examiner* — Edwin A. Leon
(74) *Attorney, Agent, or Firm* — Oblon, McClelland, Maier & Neustadt, L.L.P.

(57) ABSTRACT

A display hand for a portable object including an indication by the display hand, inside which is housed a rechargeable electrical energy source. The display hand includes at least one solar cell, the electrical energy source being connected to the display hand to be recharged.

6 Claims, 5 Drawing Sheets

(56) References Cited

U.S. PATENT DOCUMENTS

| 9,292,003 B2* | 3/2016 | Tortora | G04B 19/305 |
| 2006/0126443 A1* | 6/2006 | Kuo | G04C 17/00 |
| | | | 368/232 |
| 2012/0108002 A1* | 5/2012 | Lee | C23C 16/44 |
| | | | 438/96 |
| 2015/0346691 A1 | 12/2015 | Tortora et al. | |

FOREIGN PATENT DOCUMENTS

| FR | 2 664 994 A1 | 1/1992 |
| FR | 3 007 200 A1 | 12/2014 |

* cited by examiner

US 10,768,578 B2

SOLAR HAND FOR A PORTABLE OBJECT SUCH AS A WATCH OR A MEASURING INSTRUMENT

FIELD OF THE INVENTION

The present invention relates to a solar display hand for a portable object. The present invention concerns, in particular, a set of solar display hands for a timepiece such as a wristwatch or a measuring apparatus with an analogue display.

BACKGROUND OF THE INVENTION

In a known manner, timepieces are equipped with a dial formed of a solar cell comprising a substrate, at least one plurality of superposed layers defining at least one n-i-p or p-i-n element and a conductive layer forming a first electrode intended to be exposed to light radiation in order to power a horometrical circuit or an electrical circuit of a timepiece, such as a watch.

Patent No EP 0872783 discloses a dial formed of a solar cell for a timepiece. Such a dial is of questionable aesthetic appearance and its electrical performance is average. Indeed, a dial formed of a solar cell must be translucent, so that the cell is less visible and cannot receive any type of finish or specific colours.

SUMMARY OF THE INVENTION

It is an object of the invention to overcome the various drawbacks of these known techniques.

More specifically, it is an object of the invention to provide a display hand formed of a solar cell to obviate the need for solar dials.

These objects, in addition to others which will appear more clearly below, are achieved by the invention by means of a portable object, inside which is housed a rechargeable electrical energy source, including at least a first display hand and a second display hand.

According to the invention, said first display hand and said second display hand are formed of at least one solar cell, the electrical energy source being connected to the display hands for recharging.

According to a preferential embodiment of the invention, the solar cell is a heterojunction cell.

According to an advantageous feature of the invention, the first and second display hands are superposed and each provided with a hole for the passage of a drive arbor, the drive arbor of the second display hand being arranged concentrically inside the drive arbor of the first display hand, with the insertion of an insulating layer between the two drive arbors, each of the the first and second display hands respectively including a first pole and a second pole, the first pole of the first display hand being electrically connected to a first terminal of the energy source via the drive arbor of the first display hand, the second pole of the first display hand being connected to the first pole of the second display hand via a contact piece which ensures electrical continuity between the first and second display hands, and the second pole of the second display hand being connected to the second terminal of the energy source via the drive arbor of the second display hand.

According to another preferred feature, the contact piece is centred on the drive arbor.

Advantageously, each of the first and second display hands includes a first, respectively a second, annular element, each having a hole at the centre for the passage of the drive arbor of the first, respectively the second, display hand, the first and second annular elements each being provided with an upper surface portion directed towards an observer, and with a lower surface portion opposite the upper surface portion, the first and second annular elements being formed of an electrically conductive material, the first and second annular elements each carrying the first and second display hands.

The invention also concerns a timepiece including at least one hand according to the invention.

BRIEF DESCRIPTION OF THE DRAWINGS

Other characteristics and advantages of the invention will appear more clearly upon reading the following description of a specific embodiment of the invention, given simply by way of illustrative and non-limiting example, and the annexed Figures, among which.

DETAILED DESCRIPTION OF PREFERRED EMBODIMENTS

Figure 1:
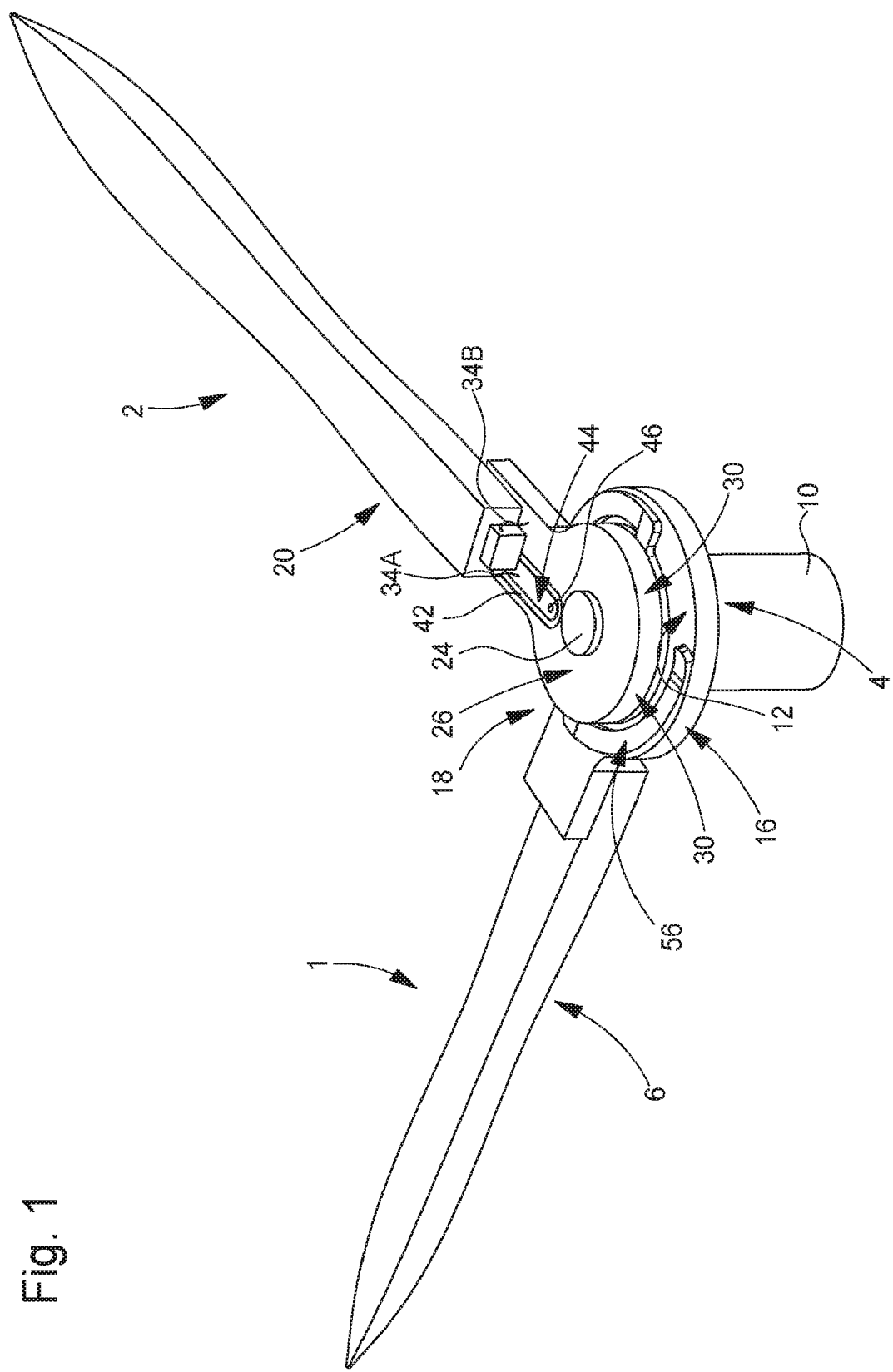
FIGS. 1 and 2 are top and bottom views of a set of hands including a solar cell according to the invention.

A control member according to a particular embodiment will now be described below referring jointly to FIGS. 1 and 2.

The invention concerns a display hand 1 for a portable device providing an indication by means of display hand 1, and inside which is housed an electrical energy source 36.

According to the invention, display hand 1 is formed of at least one solar cell, and electrical energy source 36 is connected to display hand 1 for recharging.

Although those skilled in the art may think that a set of solar hands 1, 2 cannot be a sufficient energy source compared to a dial, the inventor proved that a set of solar hands could provide a comparable energy source.

Assuming that there is luminance L at the surface of the watch, the power produced by the solar dial watch is given by the following equation:

$$P_C = L \times S_C \times T_C \times E_C \times T_G \quad (1)$$

where $S_C$ is the surface of the dial, $T_C$ the transmission, $E_C$ the efficiency of the solar cell and $T_G$ la transmission of the crystal.

Typically, the following values are observed for equation (1):

$$S_C = 8 \times 10^{-4} \text{ m}^2;\ T_C = 0.35;\ E_C = 0.04$$

By integrating these values in equation (1), one obtains:

$$P_C = L \times T_G \times 1.12 \times 10^{-5} \text{ W} \quad (2)$$

For a portable device, such as a watch, with solar hands, the power produced is given by the following equation:

$$P_A = L \times S_A \times E_A \times T_G \quad (3)$$

where $S_A$ is the surface of two hands, and $E_A$ the efficiency of the solar cell of the hands.

For a set of hour/minute hands, the surface $S_A = 4.4 \times 10^{-5}$ m².

According to a preferred embodiment of the invention, the solar cell forming display hand 1 is a heterojunction cell.

Heterojunction solar cells are obtained by placing in contact materials with different energy gaps. For example, the silicon heterojunction consists of placing in contact hydrogenated amorphous silicon (a-Si:H) with crystalline silicon (c-Si), since the energy gap of a-Si:H is much higher than that of c-Si. Since the conductivity of a-Si:H is much lower than that of c-Si, a conductive layer must be added across its entire surface in order to collect the current. On the illuminated side of the cell, this conductive layer is generally formed of a transparent conductive oxide (TOO), which collects the current. This TCO also ensures satisfactory contact with the metal electrodes, while acting as an anti-reflective layer.

The efficiency of currently available heterojunction cells is $E_A$=0.22. The thickness of such a cell is 150 μm, which is comparable to the thickness of the hands conventionally used in portable objects such as watches.

By integrating the preceding values in equation (3), one obtains:

$$P_A = L \times T_G \times 0.97 \times 10^{-5} \text{ W} \qquad (4)$$

Since the luminance and transmission of the crystal are the same in both cases, the power obtained in equations (2) and (4) is quite comparable in both cases.

Thus, the solution of solar hands has the advantage of overcoming restrictions as regards decorations for a watch dial, for example, since the dial can be made with the desired material, colour and finish.

The solar hands can be made by means of a known method described in Patent EP 0948060 in the name of Asulab S A. This Patent describes the manufacture of a circular photovoltaic cell forming a dial for a timepiece such as a watch. However, in this Patent, the invention is not limited to dials, and can be used for the manufacture of photovoltaic cells in any other form, particularly the manufacture of solar hands.

In order to transport the energy collected by the solar hands, a particular structure must be provided so that one of the poles of one of the solar hands is connected to one of the poles of the other solar hand, through the electrical contact between the two hands, which allows the drive arbors of the two hands to be used for the electrical connection of the solar hands to the terminals of the energy source. Such a structure is described by the Applicant in Patent Application No. EP14170094.8. In the following description, the structure of that Patent Application has been adapted to suit the use of solar hands.

Figure 2:
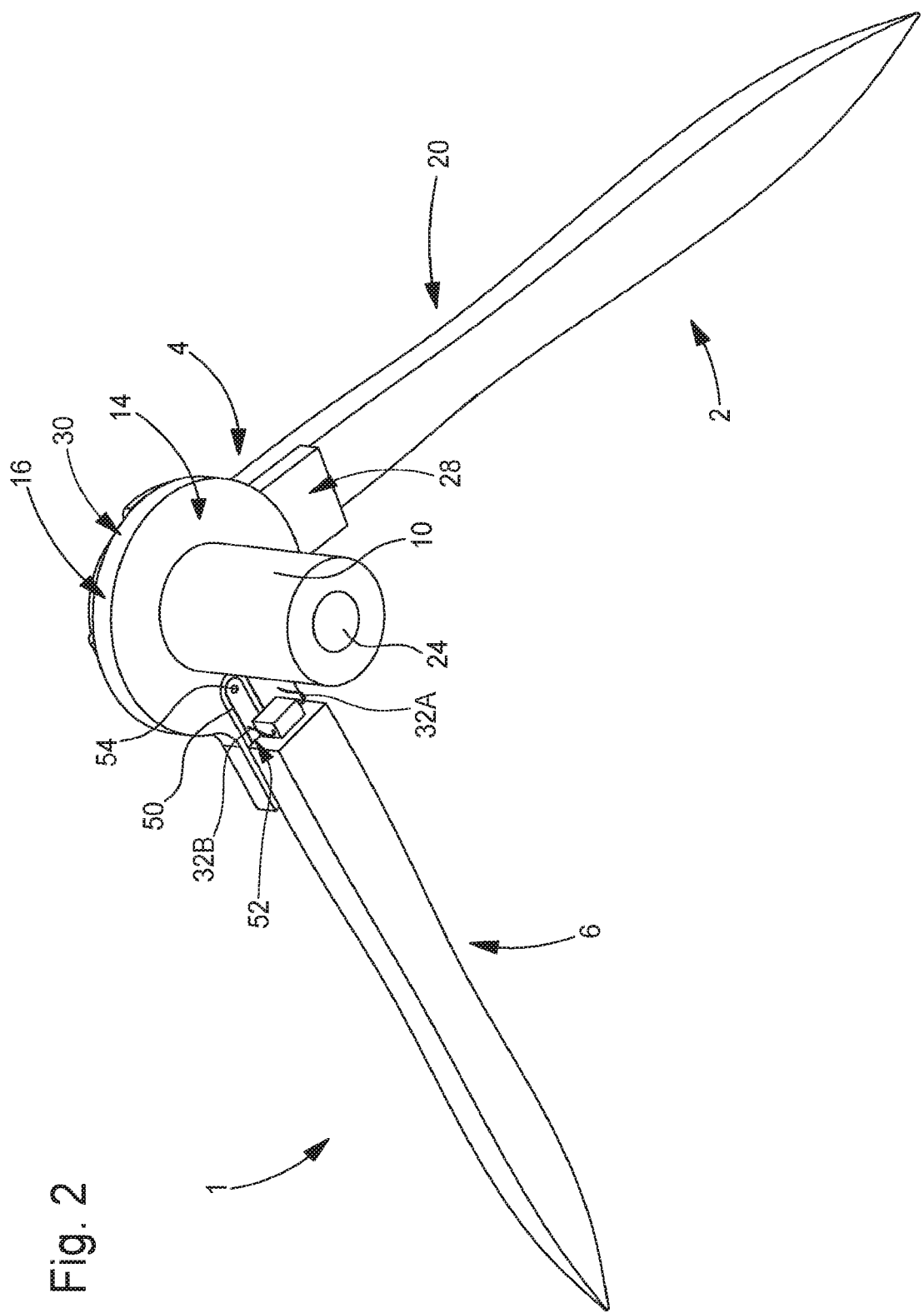
Figure 3:
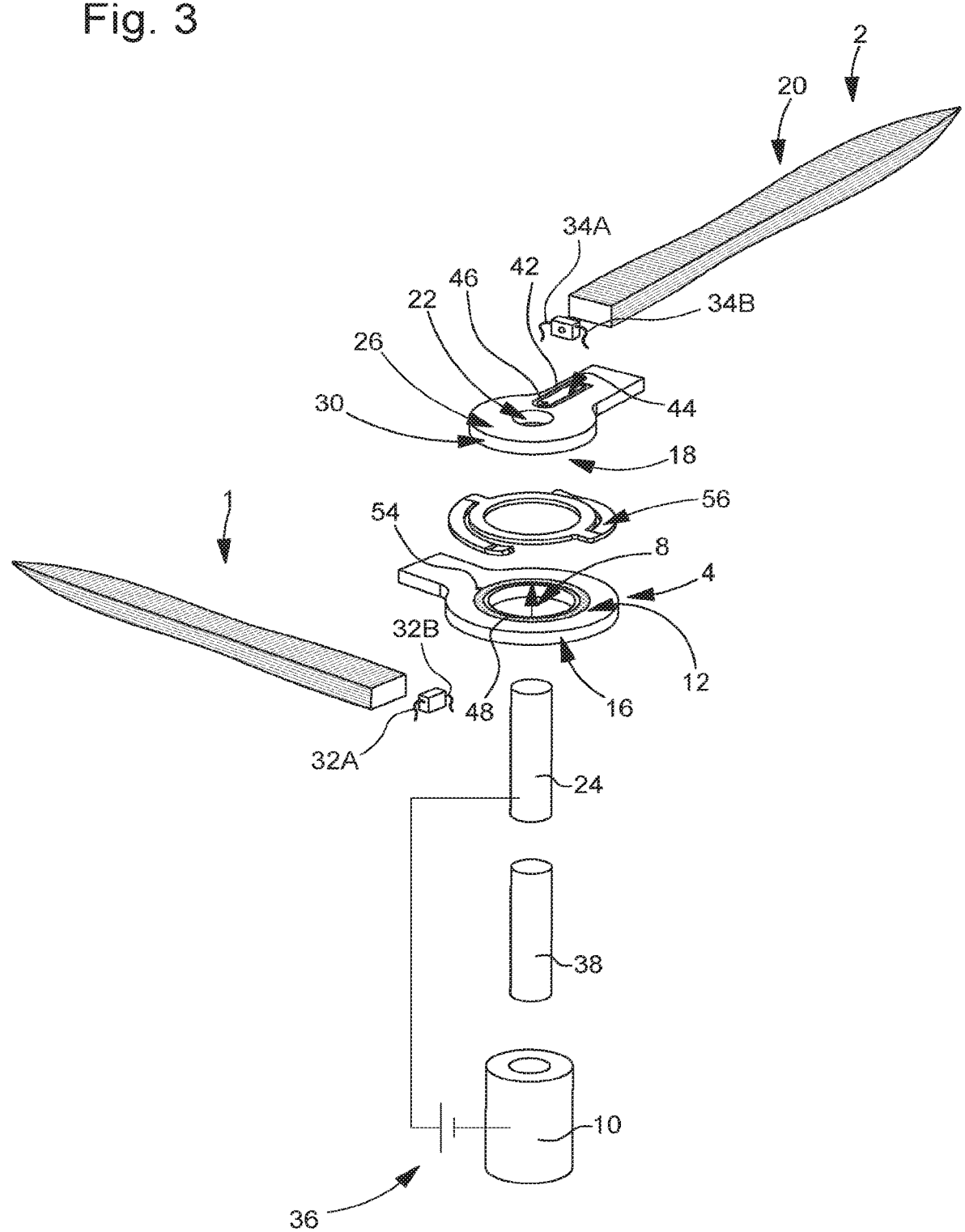
FIGS. 3 and 4 are exploded views of a set of hands including a solar cell according to the invention.

In the example represented in FIGS. 1 and 2, the set of hands according to the invention includes a first and a second display hand, respectively 1 and 2. The first display hand 1 is formed of a first annular element 4 extended by a portion 6 which can be formed by at least one solar cell and which extends in a substantially rectilinear manner. The first annular element 4 has a hole 8 at its centre for the passage of a drive arbor 10 of first display hand 1. First annular element 4 is provided with an upper surface portion 12 directed towards an observer, and with a lower surface portion 14 opposite to upper surface portion 12. The upper 12 and lower 14 surface portions of first annular element 4 are connected to each other over the entire length of their perimeter by a lateral surface 16. According to a feature of the invention which will be described in more detail below, first annular element 4 is coated with a layer of an electrically conductive material over its upper 12 and lower 14 surface portions, and inside hole 8 in which drive arbor 10 is engaged.

In a similar manner to first display hand 1, second display hand 2 is formed of a second annular element 18 extended by a portion 20 which can be formed by at least one solar cell and which extends in a substantially rectilinear manner. Second annular element 18 of second display hand 2 has a hole 22 at its centre for the passage of a drive arbor 24 arranged concentrically inside drive arbor 10 of first display hand 1. Second annular element 18 is provided with an upper surface portion 26 directed towards an observer, and with a lower surface portion 28 opposite to upper surface portion 26. The upper 26 and lower 28 surface portions of second annular element 18 are connected to each other over the entire length of their perimeter by a lateral surface 30. According to a feature of the invention which will be described in more detail below, second annular element 18 is also coated with a layer of an electrically conductive material over its upper 26 and lower 28 surface portions, and inside hole 22 in which drive arbor 24 is engaged.

First and second hands 1 and 2 include first and second poles, respectively 32A, 32B and 34A, 34B, for the electrical connection thereof to an electrical energy source 36 housed inside a frame, for example of a wristwatch fitted with the set of display hands 1, 2. The electrical energy source 36 is, for example, a rechargeable battery.

The first pole 32A of the first light source 32 is connected to energy supply source 36 via drive arbor 10 of first hand 1, and the second pole 32B of first light source 32 is connected to the first pole 34A of second light source 34 in a manner that will be described in detail below. Second pole 34B of second light source 34 is connected to energy supply source 36 via drive arbor 24 of the second display hand 2. To this end, the drive arbors 10 and 24 of the first and second display hands 1 and 2 must be electrically conductive and must be electrically insulated from each other by the insertion of an insulating layer 38.

Figure 4:
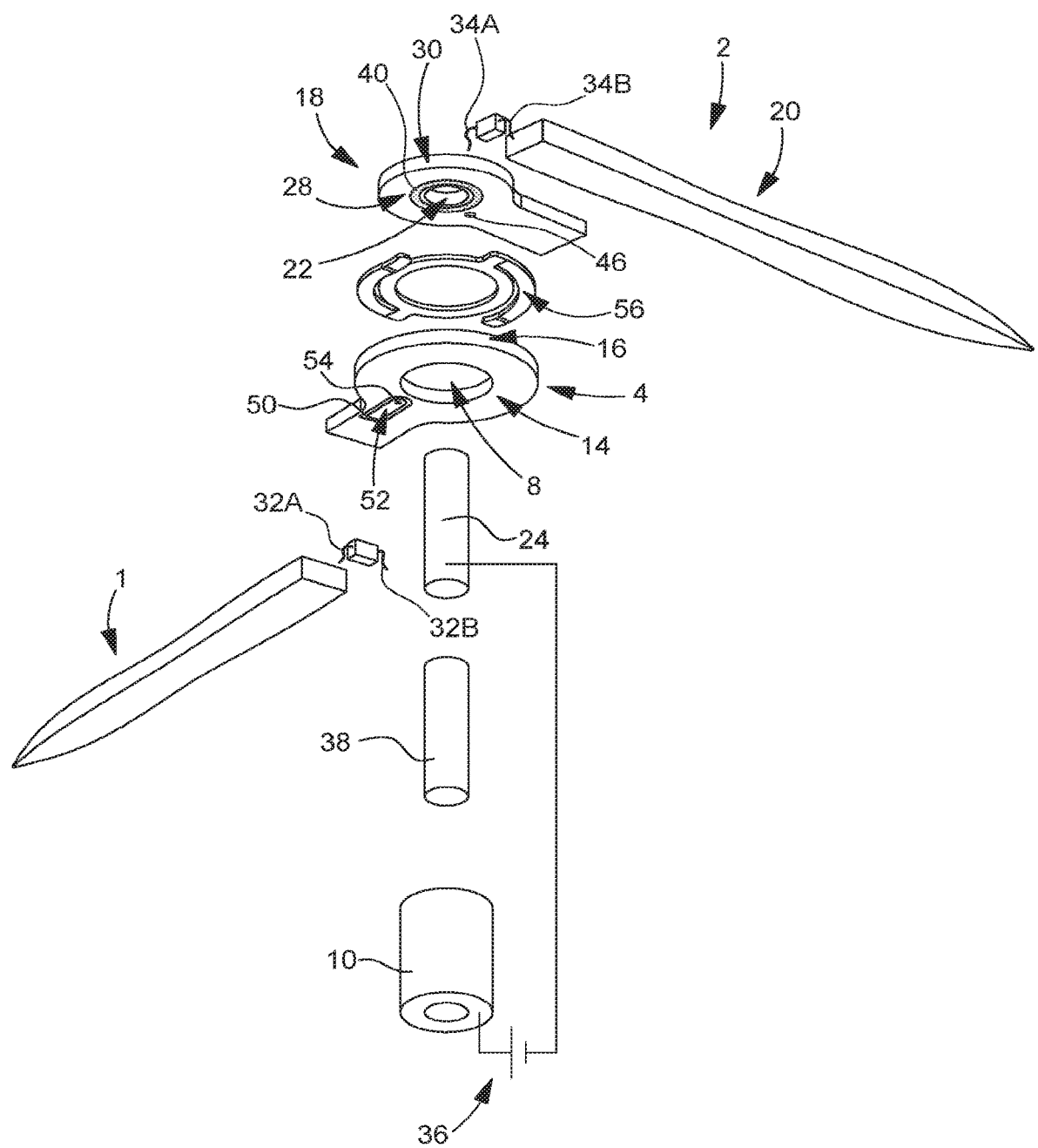
Figure 5:
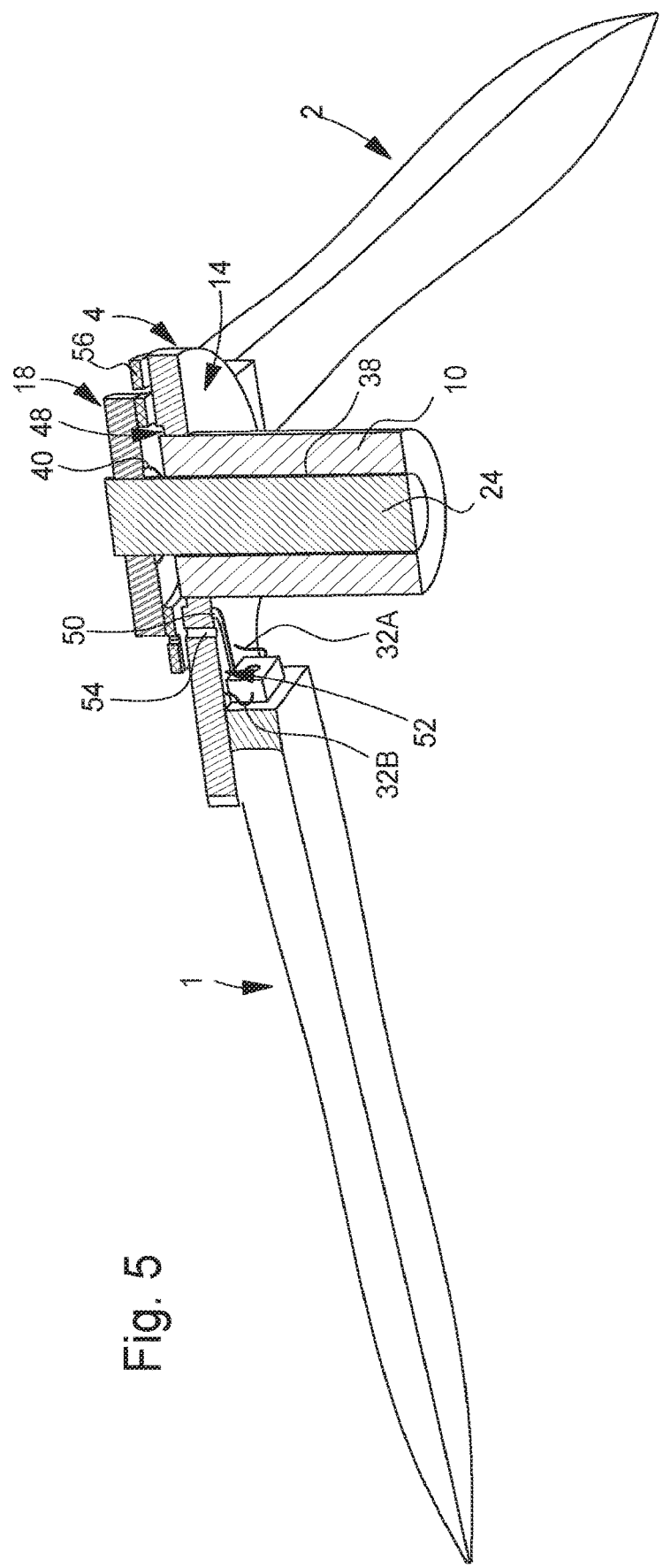
FIG. 5 is a cross-sectional view of a set of hands including a solar cell according to the invention.

As mentioned above, the first and second annular elements 4 and 18 are coated over their upper and lower surface portions with a layer of electrically conductive material. More specifically, drive arbor 24 is driven into a metallized hole 22 arranged in second annular element 18. Consequently, upper surface portion 26 of second annular element 18 is brought to the same electrical potential as drive arbor 24. Conversely (see FIG. 4), a continuous trench 40, arranged in lower surface portion 28 of second annular element 18 and made electrically insulating by the local removal of electrically conductive material, surrounds drive arbor 24, so that lower surface portion 28 is electrically insulated from drive arbor 24. Likewise, a continuous trench 42, which is closed on itself and which is made insulating in the same manner as continuous trench 40, is arranged in upper surface portion 26 of second annular element 18 so as to create an island 44 electrically insulated from the rest of upper surface portion 26. A metallized through hole 46 made in the thickness of second annular element 18 allows island 44, arranged in upper surface portion 26, and lower surface portion 28 to be electrically connected to each other.

Likewise, drive arbor 10 is driven into a metallized hole 8 in first annular element 4. Consequently, the lower surface portion 14 of first annular element 4 is brought to the same electrical potential as drive arbor 10. Conversely, a continuous trench 48, arranged in upper surface portion 12 of first annular element 4 and made electrically insulating by the local removal of electrically conductive material, surrounds drive arbor 10, so that upper surface portion 12 is electrically insulated from drive arbor 10. Likewise, a continuous trench 50, which is closed on itself and which is made insulating in the same manner as continuous trench 48, is arranged in lower surface portion 14 of first annular element 4 so as to create an island 52 electrically insulated from the rest of lower surface portion 14. A metallized through hole 54 made in the thickness of first annular element 4 allows island 52, arranged in lower surface portion 14, and upper surface portion 12 to be electrically connected to each other.

Finally, lower surface portion 28 of second annular element 18 is placed in contact with upper surface portion 12 of first annular element 4 via an electrically conductive and mechanically elastic contact piece 56 disposed between first and second display hands 1 and 2 and centred on drive arbor 10. Island 44 arranged in upper surface portion 26 is thus electrically connected to upper surface portion 12 of first annular element 4, this upper surface portion 12 being in turn electrically connected to island 52 arranged in lower surface portion 14 of first annular element 4.

According to the invention, the first pole 32A is electrically connected to a first terminal of energy supply source 36 via drive arbor 10 of first display hand 1. To this end, first pole 32A is connected, for example by a wire bonding technique, to lower surface portion 14 of first annular element 4. Second pole 32B is connected to first pole 34A via contact piece 56, which ensures electrical continuity between the first and second display hands 1 and 2. For this purpose, second pole 32B is connected to island 52 arranged in lower surface portion 14 of first annular element 4. By means of metallized through hole 54, made in the thickness of first annular element 4, island 52 is electrically connected to upper surface portion 12 of first annular element 4, this upper surface portion 12 being in turn connected, by means of contact piece 56, to lower surface portion 28 of second annular element 18. Lower surface portion 28 of second annular element 18 is in turn connected to island 44 arranged in upper surface portion 26 of second annular element 18 by means of metallized via 46. Finally, first pole 34A is electrically connected to island 44 arranged in upper surface portion 26 of second annular element 18. Second pole 34B is connected to the second terminal of energy source 36 via drive arbor 24. For this purpose, second pole 34B is electrically connected to upper surface portion 26 of second annular element 18.

Of course, the present invention is not limited to the illustrated example and is capable of various variants and modifications that will appear to those skilled in the art.

NOMENCLATURE

1. First display hand,
2. Second display hand,
4. Annular element
6. Substantially rectilinearly extending portion,
8. Hole,
10. Drive arbor,
12. Upper surface portion,
14. Lower surface portion,
16. Lateral surface,
18. Annular element,
20. Substantially rectilinearly extending portion,
22. Hole,
24. Drive arbor,
26. Upper surface portion,
28. Lower surface portion,
30. Lateral surface,
32A, 32B. First and second poles,
24A, 34B. First and second poles,
36. Electrical energy source 36,
38. Insulating layer,
56. Contact piece.

The invention claimed is:

1. A portable object inside which is housed a rechargeable electrical energy source, comprising:
   a first display hand and a second display hand,
   wherein the first display hand and the second display hand are formed of at least one solar cell, the electrical energy source being connected to the first and second display hands for recharging,
   wherein the first and second display hands are superposed and each includes a hole for passage of a drive arbor,
   the drive arbor of the second display hand being arranged concentrically inside the drive arbor of the first display hand, with an insulating layer between the two drive arbors, and
   each of the first and second display hands including a first pole and a second pole, the first pole of the first display hand being electrically connected to a first terminal of the energy source via the drive arbor of the first display hand, the second pole of the first display hand being connected to the first pole of the second display hand via a contact piece that ensures electrical continuity between the first and second display hands, and the second pole of the second display hand being connected to the second terminal of the energy source via the chive arbor of the second display hand.

2. The portable object according to claim 1, wherein the solar cell is a heterojunction cell.

3. The portable object according to claim 1, wherein the contact piece is centered on the drive arbor.

4. The portable object according to claim 1, wherein each of the first and second display hands includes a first, respectively a second, annular element each including a hole at their center for passage of the drive arbor of the first, respectively of the second, display hand, the first and second annular elements each including an upper surface portion directed towards an observer, and with a lower surface portion opposite to the upper surface portion, the first and second annular elements being formed of an electrically conductive material.

5. The portable object according to claim 4, wherein the first and second annular elements each carry the first and the second display hand.

6. A timepiece comprising the portable object according to claim 1.

* * * * *

UNITED STATES PATENT AND TRADEMARK OFFICE
CERTIFICATE OF CORRECTION

Page 1 of 1

PATENT NO. : 10,768,578 B2
APPLICATION NO. : 15/770340
DATED : September 8, 2020
INVENTOR(S) : Pierpasquale Tortora It is certified that error appears in the above-identified patent and that said Letters Patent is hereby corrected as shown below:

In the Claims

In Column 6, Line 37 (approx.), Claim 1, delete "chive" and insert -- drive --.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*